United States Patent
Chen et al.

(10) Patent No.: US 7,901,085 B2
(45) Date of Patent: Mar. 8, 2011

(54) PROJECTION APPARATUS AND LAMP MODULE

(75) Inventors: Te-Tang Chen, Hsinchu (TW); Shang-Hsuang Wu, Hsinchu (TW); Nien-Hui Hsu, Hsinchu (TW)

(73) Assignee: Coretronic Corporation, Hsin-Chu (TW)

( * ) Notice: Subject to any disclaimer, the term of this patent is extended or adjusted under 35 U.S.C. 154(b) by 655 days.

(21) Appl. No.: 11/943,574

(22) Filed: Nov. 20, 2007

(65) Prior Publication Data

US 2008/0198336 A1 Aug. 21, 2008

(30) Foreign Application Priority Data

Feb. 16, 2007 (TW) ................................ 96106084 A

(51) Int. Cl.
*G03B 21/18* (2006.01)
*B60Q 1/26* (2006.01)
*F21V 29/00* (2006.01)

(52) U.S. Cl. ............................ 353/61; 362/227; 362/264
(58) Field of Classification Search ............... 353/88–93, 353/94, 122, 52–61; 362/227, 264, 240; 349/5–9

See application file for complete search history.

(56) References Cited

U.S. PATENT DOCUMENTS

| | | | | |
|---|---|---|---|---|
| 6,834,985 B2 * | 12/2004 | Chou et al. | | 362/373 |
| 6,857,761 B2 * | 2/2005 | Chang | | 362/234 |
| 7,083,286 B2 * | 8/2006 | Kim et al. | | 353/61 |
| 7,140,734 B2 * | 11/2006 | Lim | | 353/61 |
| 7,222,975 B2 * | 5/2007 | Lin | | 353/94 |
| 7,241,018 B2 * | 7/2007 | Shin | | 353/119 |
| 7,484,852 B2 * | 2/2009 | Kuraie | | 353/57 |
| 7,537,348 B2 * | 5/2009 | Horiguchi et al. | | 353/52 |

FOREIGN PATENT DOCUMENTS

| | | |
|---|---|---|
| CN | 1499242 | 5/2004 |
| CN | 1580942 | 2/2005 |
| TW | 524319 | 3/2003 |
| TW | 580545 | 3/2004 |

OTHER PUBLICATIONS

"Office Action of Taiwan Counterpart Application" issued on Jan. 12, 2010, p. 1-p. 4.
"1st Office Action of China counterpart application", issued on Sep. 11, 2009, p. 1-p. 5.

* cited by examiner

*Primary Examiner* — Thanh X Luu
*Assistant Examiner* — Danell L Owens
(74) *Attorney, Agent, or Firm* — Jianq Chyun IP Office

(57) ABSTRACT

A projection apparatus including a casing, a lamp module, an imaging system and an optical engine is provided. The lamp module is disposed in the casing and includes a frame, a first fan, a plurality of light sources and a wind guiding device. The first fan is disposed on the frame and provides a cooling airflow. The light sources provide a light beams. The wind guiding device is disposed between the first fan and the frame, and has a baffle disposed on a flowing path of the cooling airflow to divide the cooling airflow into a plurality of cooling sub-airflows for cooling the light sources respectively. The imaging system and the optical engine are received in the casing and disposed on the transmission path of the light beam, and the optical engine is positioned between the lamp module and the imaging system.

23 Claims, 7 Drawing Sheets

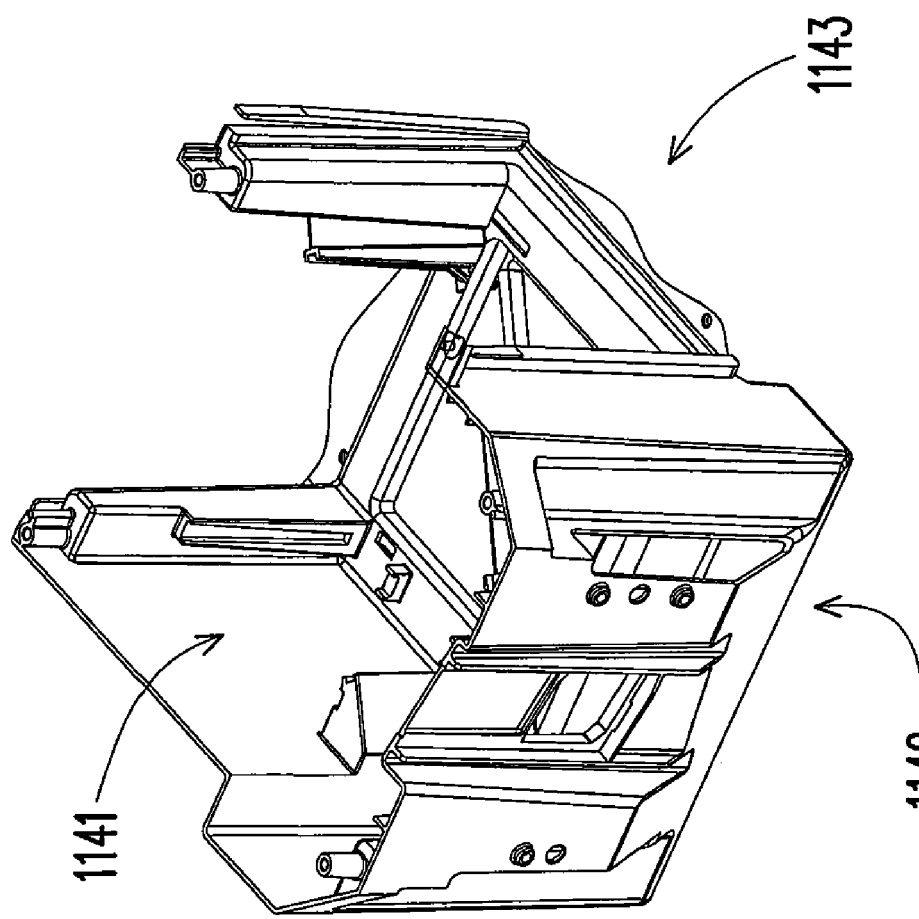

PROJECTION APPARATUS AND LAMP MODULE

CROSS-REFERENCE TO RELATED APPLICATION

This application claims the priority benefit of Taiwan application serial no. 96106084, filed on Feb. 16, 2007. All disclosure of the Taiwan application is incorporated herein by reference.

BACKGROUND OF THE INVENTION

1. Field of the Invention

The present invention generally relates to a projection apparatus, and particularly, to a projection apparatus having a plurality of light sources.

2. Description of Related Art

As science and technology develop, demand of projection apparatus for higher brightness are increasing, which can not be satisfied by that having a single light source. Accordingly, projection apparatus employing multiple light sources have been proposed.

However, projection apparatus employing multiple light sources correspondingly consumes more electricity, which also generates excessive heat. Therefore, the heat dissipation system, especially for the multiple light sources, becomes a critical concern in designing the projection apparatus. Light sources generate a lot of heat, thus heat dissipation systems for light sources are very important for controlling the temperature thereof within a range prescribed by the manufacturers in order to maintain the characteristics and lifetime of the light sources.

In a conventional projection apparatus employing multiple light sources, a typical heat dissipation system used for conventional projection apparatus employing a single light source is used, which comprises a blower, a wind duct and an axial fan disposed adjacent to the single light source, and the wind duct is capable of guiding a cooling airflow generated by the blower to a burner of the light source for cooling down the temperature thereof. The axial fan is capable of generating another cooling airflow for cooling a reflecting cover of the light source. However, when such a heat dissipation system is employed in a projection apparatus using multiple light sources, corresponding numbers of fans, wind ducts and axial fans are required, which increases not only the cost but also the volume thereof. Further, using more blowers not only consumes more electricity, but also makes the system circuit thereof more complex. Also, using more blowers even limits the size of the projection apparatus, so that the bulkiness thereof cannot be minimized.

SUMMARY OF THE INVENTION

Accordingly, the present invention is directed to a projection apparatus, which uses comparatively fewer fans than the conventional art described above, and also to a lamp module comprising fewer fans than the conventional lamp module.

The present invention can be further understood by description in detail according to the present invention below.

Accordingly, the present invention provides a projection apparatus including a casing, a lamp module, an imaging system and an optical engine. The casing has an air outlet and an air inlet. The lamp module is disposed in the casing, and includes a frame, a first fan, a plurality of light sources and a wind guiding device. The first fan is disposed on the frame, and is capable of providing a cooling airflow. The light sources are capable of providing a light beam. The wind guiding device is disposed between the first fan and the frame and includes a baffle disposed on a flow path of the cooling airflow. The baffle is capable of dividing the cooling airflow into a plurality of cooling sub-airflows, which are capable of cooling the light sources respectively. The imaging system and the optical engine are received in the casing, and disposed on a transmission path of the light beam. The optical engine is positioned between the lamp module and the imaging system.

According to the present invention, a plurality of light sources is distributed along the periphery of the first fan, so that the light sources share the cooling airflow provided by the first fan for heat dissipation. Thus, the present invention reduces number of fans required for the projection apparatus for heat dissipation thereof.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 5 is a schematic view illustrating a second receiving space shown in FIG. 3.

DESCRIPTION OF THE EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein are meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

The First Embodiment

Figure 2:
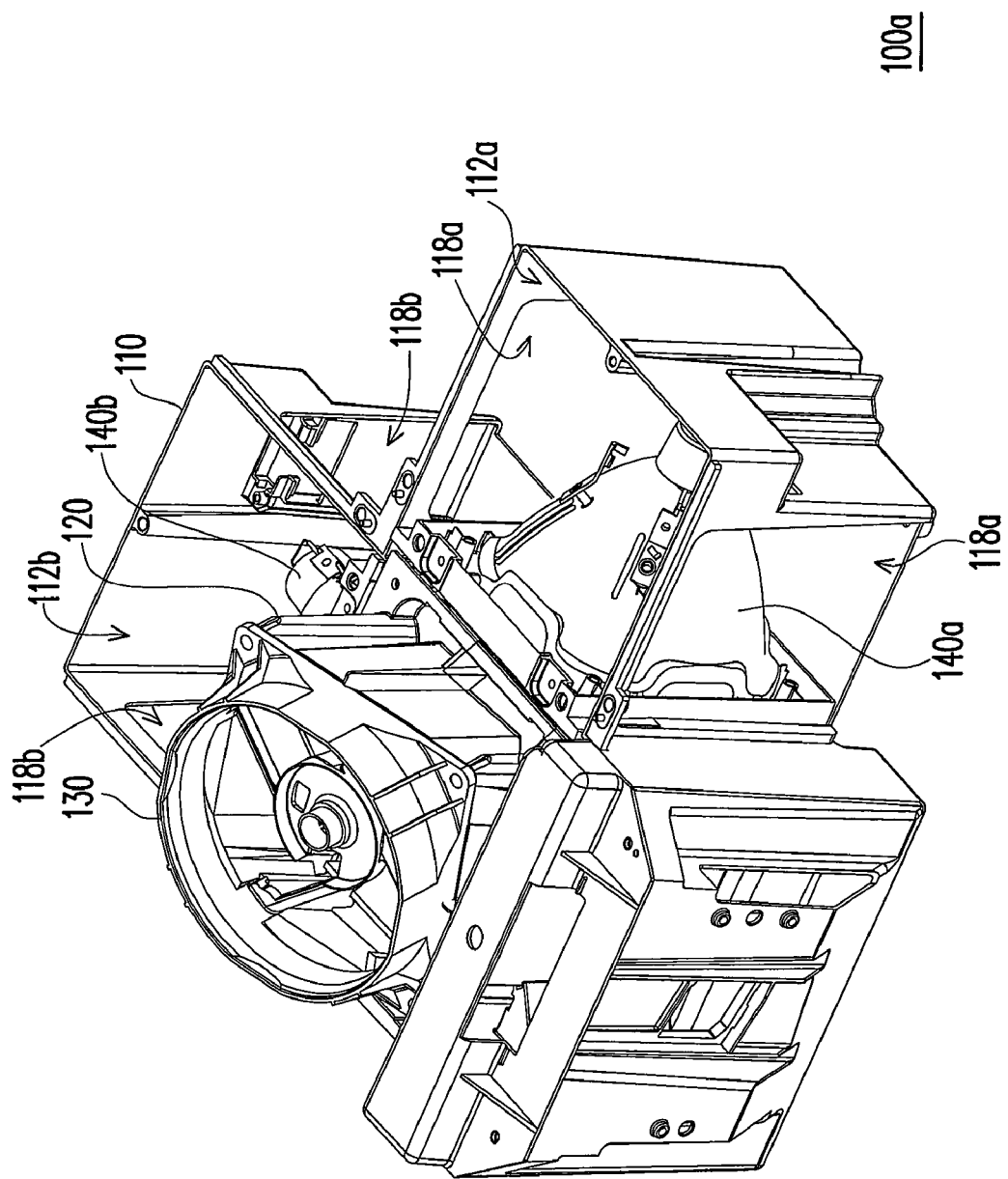
FIG. 2 is a solid view of a lamp module of the projection apparatus illustrated in FIG. 1.
Figure 3:
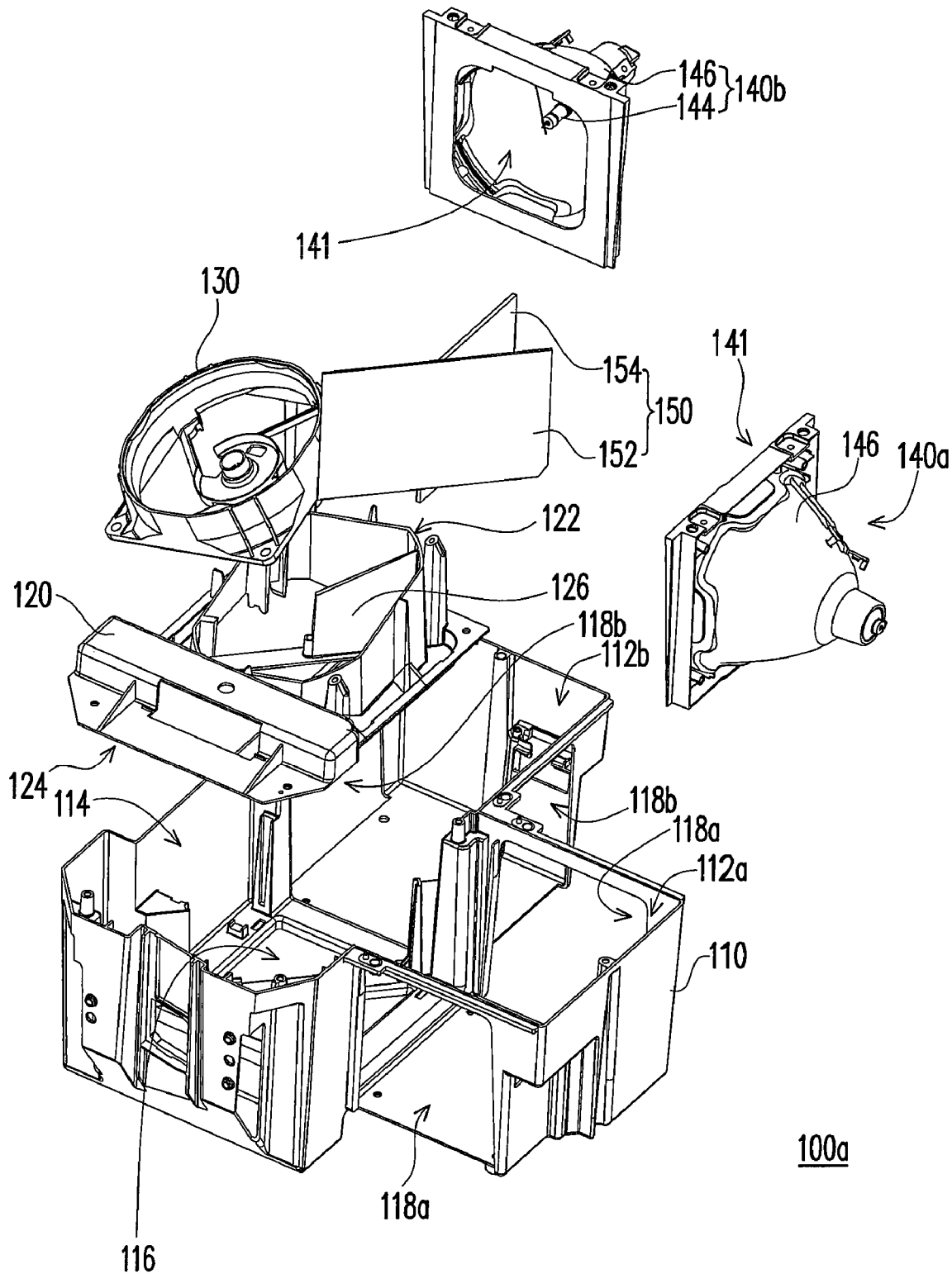
FIG. 3 is an explosive view of the FIG. 2.
Figure 4A:
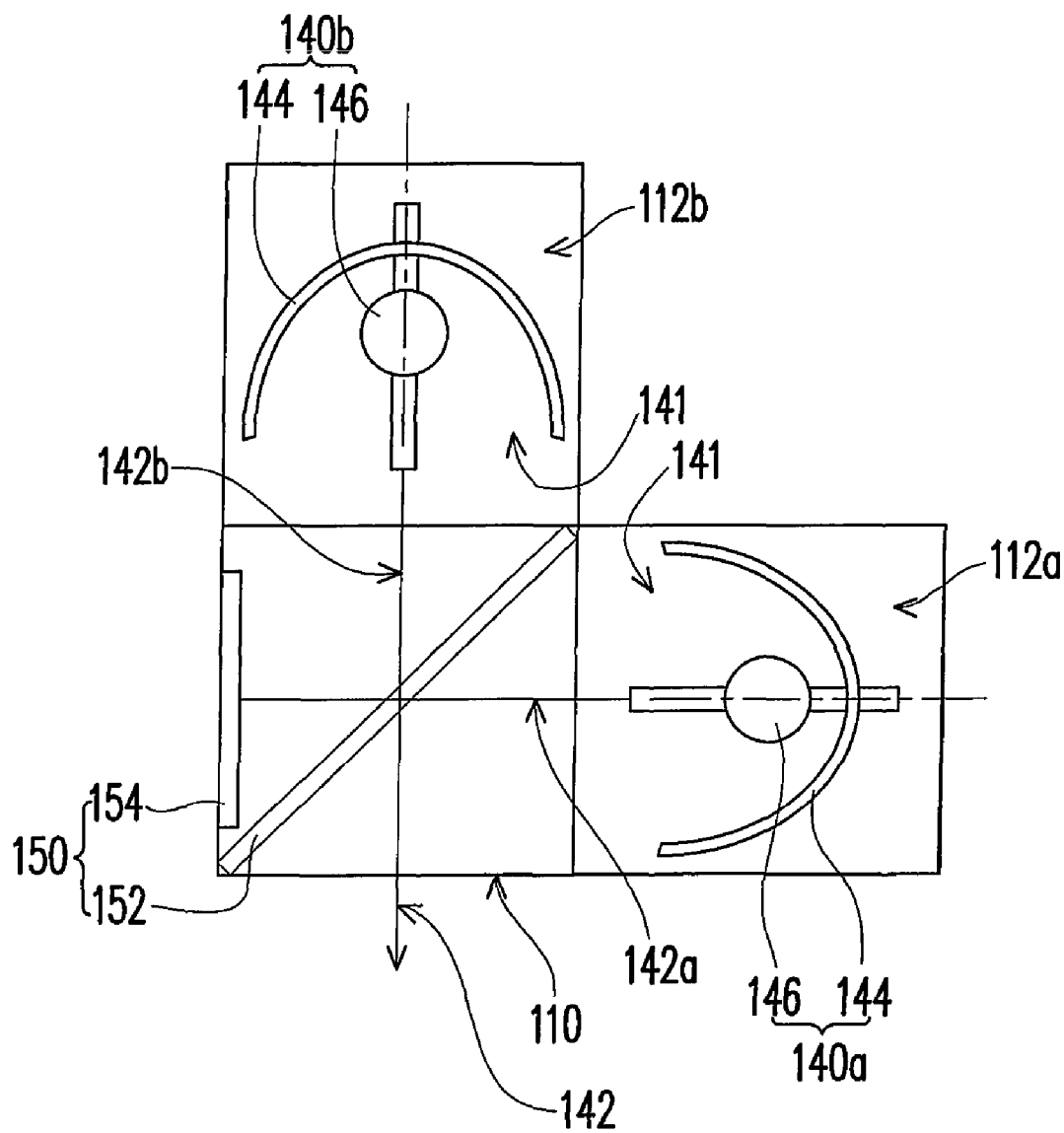
FIG. 4A is a top view of the lamp module according to the first embodiment of the present invention.

Referring to FIGS. 1 to 4A, a projection apparatus 10 according to the first embodiment of the present invention includes a lamp module 100a, an optical engine 200, an imaging system 300, and a casing 400. The lamp module 100a, the optical engine 200, and the imaging system 300 are disposed in the casing 400. The lamp module 100a is capable of providing a light beam 142 as shown in FIG. 4A. The optical engine 200 and the imaging system 300 are disposed on a transmission path of the light beam 142. The optical engine 200 is disposed between the lamp module 100a and the imaging system 300. According to the first embodiment, the casing 400 for example has an air outlet 410 located at a corner of the casing 400, while the lamp module 100a is disposed adjacent to the air outlet 410 for obtaining higher heat dissipation efficiency.

In details, the lamp module 100a includes a frame 110, two light sources 140a and 140b, a combiner 150 as shown in FIG. 3, a first fan 130, and a wind guiding device 120. The frame 110 includes two first receiving spaces 112a and 112b, a second receiving space 114, and a first opening 116 defined thereby, as shown in FIG. 3. The second receiving space 114 has a top portion 1141 as shown in FIG. 5, a bottom portion 1142 opposite to the top portion 1141 as shown in FIG. 5, and a plurality of side portions 1143 connecting between the top portion 1141 and the bottom portion 1142 as shown in FIG. 5. The first receiving spaces 112a and 112b are defined at two side portions 1143 of the second receiving space 114, and specifically, according to the first embodiment, at two adjacent side portions 1143 of the second receiving space 114. The first opening 116 is defined at the bottom portion 1142 of the second receiving space 114.

The light sources 140a and 140b of the lamp module 100a are capable of providing the light beam 142. The light sources 140a and 140b are correspondingly received in the first receiving spaces 112a and 112b, respectively, and light outgoing sides 141 thereof face the second receiving space 114. The light sources 140a and 140b are capable of providing sub light beams 142a and 142b respectively, as shown in FIG. 4A. Each of the light sources 140a and 140b includes a lamp reflector 144 and a burner 146. The lamp reflectors 144 are received in the first receiving spaces 112a and 112b, respectively, while the burners 146 are disposed in the lamp reflectors 144, respectively.

Figure 1:
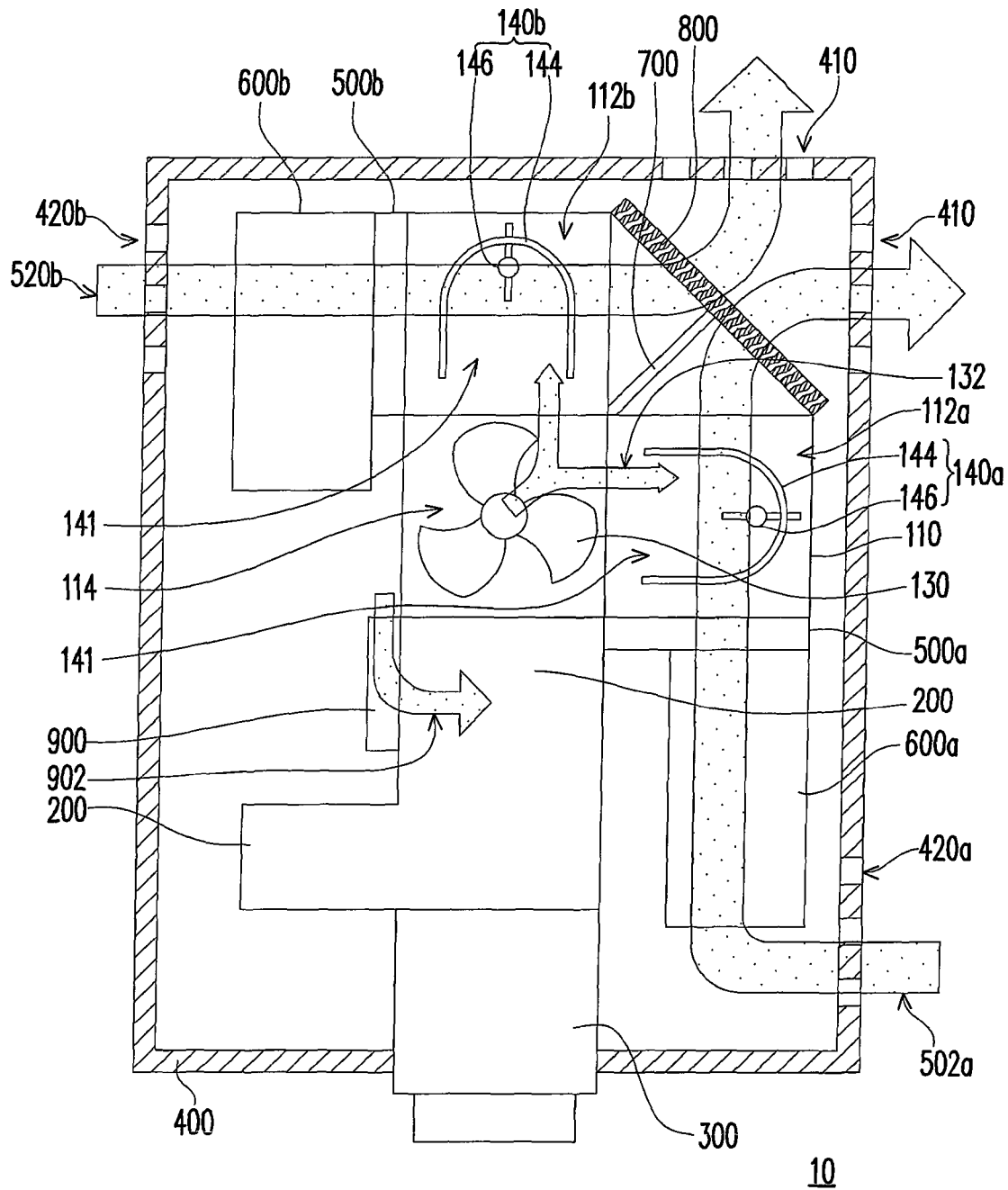
FIG. 1 is a schematic structural view of a projection apparatus according to a first embodiment of the present invention.

The combiner 150 is received in the second receiving space 114 of the frame 110, and on transmission paths of the sub light beams 142a and 142b. According to an aspect of the first embodiment, the sub light beams 142a and 142b are perpendicular to each other. The combiner 150 is capable of combining the sub light beams 142a and 142b into the light beam 142, and transmitting the light beam 142 to the optical engine 200 as shown in FIG. 1. More specifically, according to an aspect of the first embodiment, the combiner 150 for example is composed of a spectroscope 152 and a reflector 154. When the sub light beams 142a and 142b project on the spectroscope 152, a part of the sub light beam 142a is reflected by the spectroscope 152 to the optical engine 200, another part of the sub light beam 142a passes through the spectroscope 152 and then is reflected by the reflector 154 back to the spectroscope 152. At the same time, a part of the sub light beam 142b passes through the spectroscope 152 and projects on the optical engine 200, while another part of the sub light beam 142b is reflected by the spectroscope 152, and then is reflected by the reflector 154 back to the spectroscope 152. Furthermore, a part of the sub light beams 142a and 142b which are reflected by the reflector 154 pass through the spectroscope 152 and project on the light source 140a, while another part is reflected by the spectroscope 152 to project on the light source 140b. In such a manner, the sub light beams 142a and 142b are converted by the combiner 150 into the light beam 142 and transmitted to the optical engine 200. However, it is to be noted that the foregoing description is not for limiting the present invention. Other approaches of converting the sub light beams 142a and 142b by the combiner 150 into the light beam 142 and transmitting the same to the optical engine 200 can be learnt by referring to Taiwan Patent Publication No. 00580545, and are not iterated herein.

The first fan 130 is disposed on the frame 110, and located at the top portion 1141 of the second receiving space 114, and is capable of providing a cooling airflow 132, as shown in FIG. 1. The first fan 130, for example, is an axial fan. However, the first fan 130 can also be other types of fans, e.g., a blower.

The wind guiding device 120 is disposed on the frame 110 and is capable of guiding the cooling airflow 132 to the light sources 140a and 140b, and the combiner 150, so that the light sources 140a and 140b, and the combiner 150 share the cooling airflow 132 for heat dissipation. More specifically, the wind guiding device 120 is disposed on a top portion 1141 of the second receiving space 114 of the frame 110, and located between the frame 110 and the first fan 130. The wind guiding device 120 includes a carrying surface 122 connecting the first fan 130 as shown in FIG. 3, and a connecting surface 124 connecting the frame 110 as shown in FIG. 3. The carrying surface 122 is not parallel to the connecting surface 124, so that as the first fan 130 is connected to the frame 110 by the wind guiding device 120, an axis of the first fan 130 defines an angle with a light axis of at least one of the light sources 140a and 140b. According to another aspect of the first embodiment, as shown in FIG. 2, the axis of the first fan 130 defines angles with light axes of both of the light sources 140a and 140b respectively. The wind guiding device 120, for example, is a hollow rectangular pillar. The wind guiding device 120 includes a baffle 126 as shown in FIG. 3 disposed on a path of the cooling airflow 132 for dividing the cooling airflow into a plurality of cooling sub-airflows, e.g., a first cooling sub-airflow, a second cooling sub-airflows, and a third cooling sub-airflows, for respectively cooling the light sources 140a and 140b, and the combiner 150. The baffle 126 is not parallel to the connecting surface 124 such that the cooling sub-airflows are guided to the burners 146 of the light sources 140a and 140b.

When the first fan 130 is operating, the cooling airflow 132 provided thereby is divided by the baffle 126 into the first cooling sub-airflow, the second cooling sub-airflow, and the third cooling sub-airflow, which respectively flow to two opposite sides of the combiner 150, the burners 146 of the light sources 140a and 140b, and then pass the first opening 116, the air outlet 410 in sequence, and finally exit out from the casing 400 therefrom. As such, the cooling airflow 132 is shared by the burners 146 of the light sources 140a and 140b, and the combiner 150 for heat dissipation.

Furthermore, the projection apparatus 10 further includes two second fans 500a and 500b, and two power supplies 600a and 600b. The frame 110 has two second openings 118a at the first receiving space 112a, and two second openings 118b at the first receiving space 112b, respectively. The casing 400 further includes two air inlets 420a and 420b. The second openings 118a are located at two opposite sides of the light source 140a, and the second openings 118b are located at two opposite sides of the light source 140b. The air inlets 420a and 420b are located at two corners of the casing 400 apart from an air outlet 410. The lamp module 100a is disposed apart from the air inlets 420a and 420b.

Furthermore, the second fan 500a and the power supply 600a are assembled corresponding to the light source 140a and disposed between the air outlet 410 and the air inlet 420a. The second fan 500a is located adjacent to the second opening 118a and between the frame 110 and the power supply 600a. The power supply 600a is located between the second fan 500a and air inlet 420a. The second fan 500b and the power supply 600b are assembled corresponding to the light source 140b and disposed between the air outlet 410 and the air inlet 420b. The second fan 500b is located adjacent to the second opening 118b and between the frame 110 and the power supply 600b. The power supply 600b is located between the second fan 500b and the air inlet 420b.

The projection apparatus 10 further includes a baffle 700 and a light shelter 800, which are disposed between the lamp module 100a and the air outlet 410 of the casing 400. The baffle 700 is located adjacent to the frame 110, and between the light sources 140a and 140b, and the light shelter 800, and also adjacent to where is between the second openings 118a and 118b of the first receiving spaces 112a and 112b for guiding cooling airflows 502a and 502b provided by the second fans 500a and 500b to flow to the air outlet 410 via two opposite sides of the baffle 700. The light shelter 800 is located adjacent to the air outlet 410, and adjacent to the second openings 118a and 118b of the first receiving spaces 112a and 112b, for preventing light provided by the light sources 140a and 140b leaking from the air outlet 410.

Furthermore, when the second fan 500a is operating, the cooling airflow 502a provided thereby flows into the casing 400 via the air inlet 420a, and passes the power supply 600a, the second fan 500a, and two opposite second openings 118a in sequence, and is then guided by the baffle 700 to one side of the light shelter 800, and finally exits out of the casing 400 from the air outlet 410. The cooling airflow 502a flows by an external surface of the lamp reflector 144 of the light source 140a when passing through the second openings 118a of the frame 110, so that it also cools down the lamp reflector 144 of the light source 140a. Likewise, when the second fan 500b is operating, the cooling airflow 502b provided thereby flows into the casing 400 via the air inlet 420b, and passes the power supply 600b, the second fan 500b, and two opposite second openings 118b in sequence, and is then guided by the baffle 700 to another side of the light shelter 800, and finally exits out of the casing 400 from the air outlet 410. The cooling airflow 502b flows by an external surface of the lamp reflector 144 of the light source 140b when passing through the second openings 118b of the frame 110, so that it also cools down the lamp reflector 144 of the light source 140b.

It can be known from the foregoing description of the above embodiment, that the cooling airflows 502a and 502b are capable of cooling corresponding power supplies 600a and 600b, and corresponding lamp reflectors 144 of the light sources 140a and 140b, respectively. The second fans 500a and 500b, for example, are axial fans. However, they can also be other types of fans, e.g., blowers.

Moreover, the projection apparatus 10 further includes a third fan 900, which is disposed adjacent to the optical engine 200. A cooling airflow 902 provided by the third fan 900 is for cooling optical components of the optical engine 200 including, for example, a color wheel, a light integration rod, lenses, a total internal reflection (TIR) prism and a digital micromirror device (DMD). The third fan 900, for example, is a blower. However, it can also be other types of fans, e.g., axial fans. When the third fan 900 is operating, an air inlet thereof inhales airflow inputted from the air inlet 420b into the casing 400, and the airflow is then evacuated from an air outlet thereof to the optical engine 200 for cooling the optical elements of the optical engine 200, and then exits out of the casing 400 from the air outlet 410.

It is to be noted that the first fan 130 has a power greater than that of the second fans 500a and 500b, and the third fan 900, so that the cooling airflow 132 provided by the first fan 130 drives the cooling airflows 502a, 502b and 902 provided by the second fans 500a and 500b, and the third fan 900, respectively to pass through the air outlet 410 and exit out of the casing 400 therefrom. In such a way, the cooling airflows 132, 502a, 502b and 902 does not remain in the casing 400, thus avoiding a continuous rise in the temperature within the casing.

The Second Embodiment

Figure 4B:
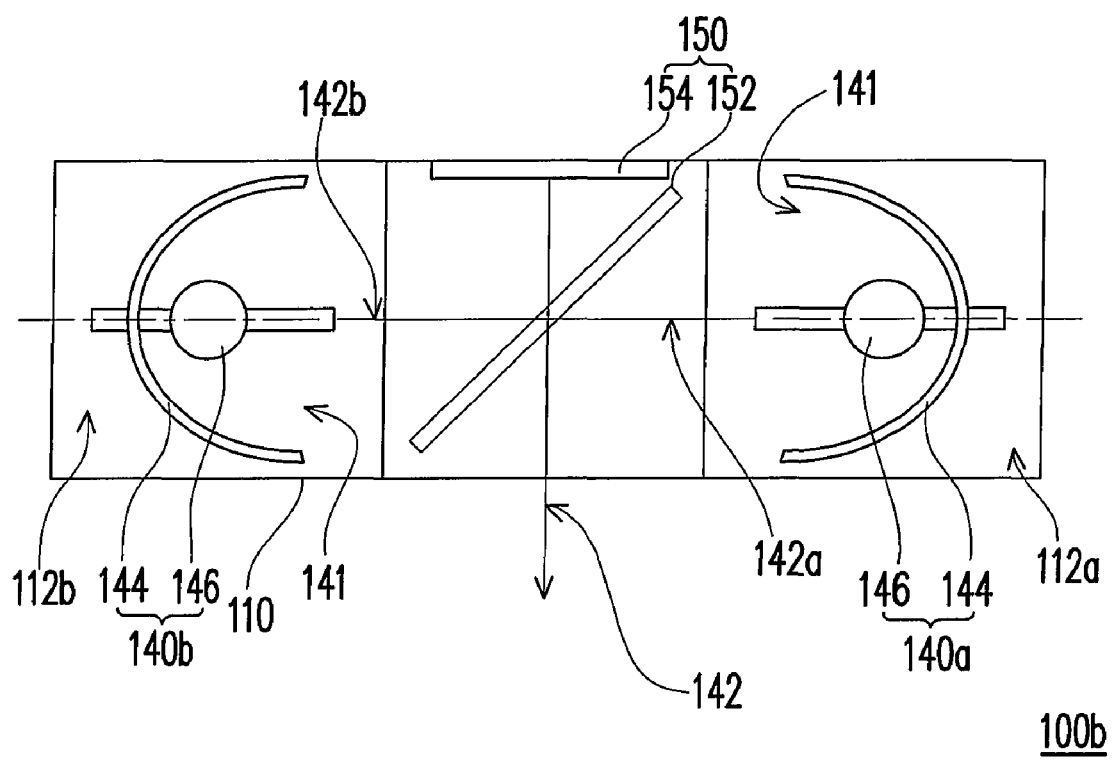
FIG. 4B is a top view of the lamp module according to a second embodiment of the present invention.

Referring to FIG. 4B, the structure of the lamp module 100b according to the second embodiment of the present invention is similar to the lamp module 100a described with reference to FIG. 4A except the following differences. The first receiving spaces 112a and 112b are defined at two opposite side portions 1143 of the second receiving space 114, and the light sources 140a and 140b are received in corresponding first receiving spaces 112a and 112b. The light outgoing side 141 of each of the light sources 140a and 140b faces the second receiving space 114, and the sub light beams 142a and 142b provided by the light sources 140a and 140b are parallel to each other. Similarly, other approaches of converting the sub light beams 142a and 142b by the combiner 150 into the light beam 142 and transmitting the same to the optical engine 200 can be learnt by referring to Taiwan Patent Publication No. 00580545, and are not iterated herein.

The Third Embodiment

Figure 4C:
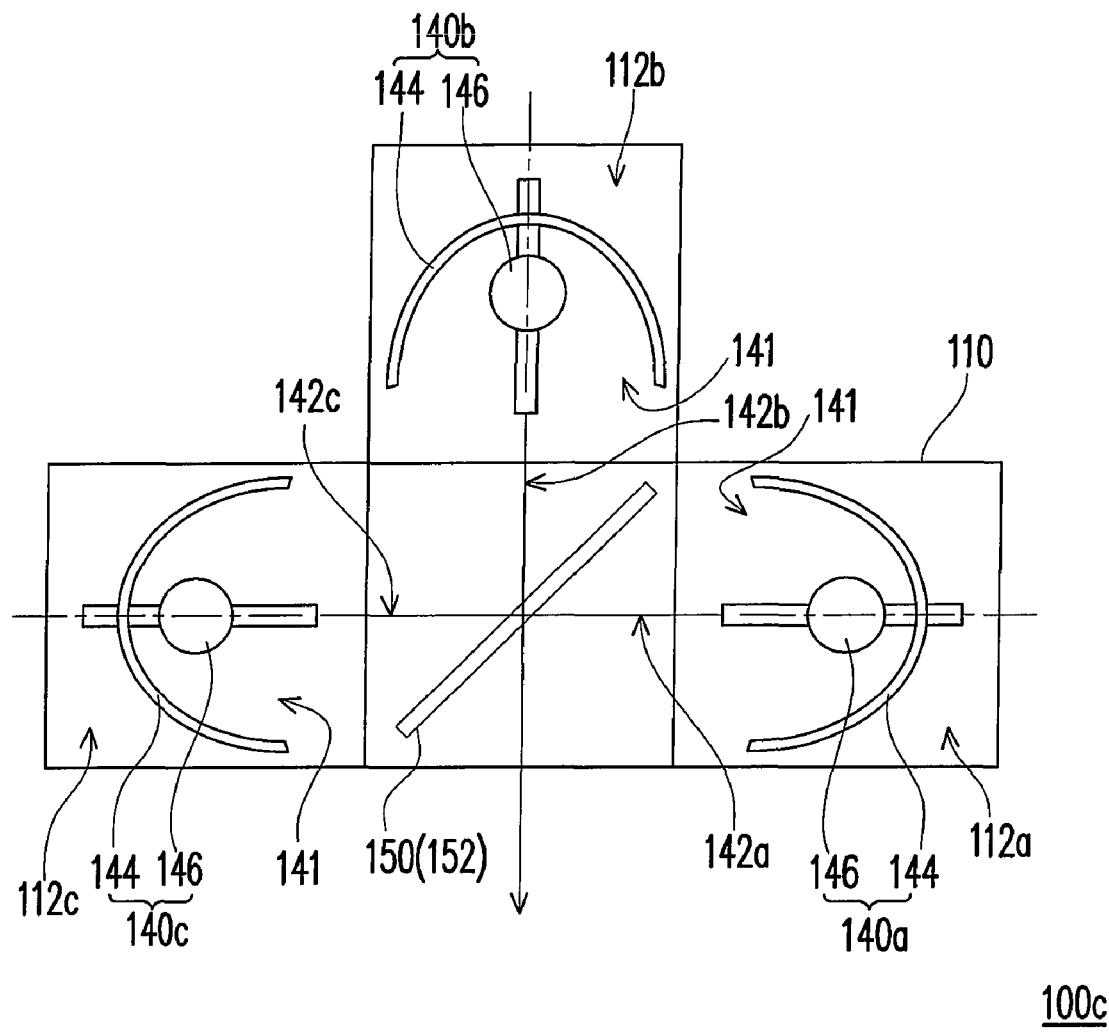
FIG. 4C is a top view of the lamp module according to a third embodiment of the present invention.

Referring to FIG. 4C, the structure of the lamp module 100b according to the third embodiment of the present invention is similar to the lamp module 100a of the first embodiment described with reference to FIG. 4A except the following differences. The frame 110 includes three first receiving spaces 112a, 112b and 112c, the lamp module 100c includes three light sources 140a, 140b and 140c, while the combiner 150 includes a spectroscope 152 only. The first receiving spaces 112a, 112b and 112c are defined at three neighboured side portions 1143 adjacent to each other of the second receiving space 114. The light sources 140a, 140b and 140c are correspondingly received in the first receiving spaces 112a, 112b and 112c, while the light outgoing sides 141 of each of the light sources 140a, 140b and 140c face the second receiving space 114. The sub light beams 142a and 142c provided by the light sources 140a and 140c are parallel to each other, while the sub light beam 142b is perpendicular relative to the sub light beams 142a and 142c. Similarly, other approaches of converting the sub light beams 142a, 142b and 142c by the combiner 150 into the light beam 142 and transmitting the same to the optical engine 200 can be learnt by referring to Taiwan Patent Publication No. 00580545, and are not iterated herein.

In summary, the present invention proposes disposing a plurality of light sources along the periphery of the first fan, so that the light sources share the cooling airflow provided by the first fan for heat dissipation. Therefore, fewer heat dissipation components are used to achieve satisfactory heat dissipation. Further, because the present invention uses fewer fans compared to the conventional art, the weight and volume of the projection apparatus are effectively reduced. Furthermore, a control circuit used in the present invention is simplified because of using less number of heat dissipation components, and the reliability of the present invention is also improved.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection apparatus, comprising:
    a casing, having an air outlet and an air inlet;
    a lamp module, disposed in the casing, comprising:
        a frame;
        a first fan, disposed on the frame, for providing a cooling airflow;
        a plurality of light sources, for providing a light beam; and
        a wind guiding device, disposed between the first fan and the frame, and comprising a baffle disposed on a flow path of the cooling airflow for dividing the cooling airflow into a plurality of cooling sub-airflows for cooling the light sources respectively, wherein the wind guiding device comprises a carrying surface connecting the first fan and a connecting surface connecting the frame, the carrying surface is not parallel to the connecting surface, and an axis of the first fan defines an angle with a light axis of at least one of the light sources;
    an imaging system, received in the casing, and disposed on a transmission path of the light beam; and
    an optical engine, received in the casing, disposed on the transmission path of the light beam, and positioned between the lamp module and the imaging system.

2. The projection apparatus according to claim 1, wherein the air outlet is located at a corner of the casing, the air inlet is located at another corner of the casing apart from the air outlet, and the lamp module is disposed adjacent to the air outlet.

3. The projection apparatus according to claim 1, wherein the lamp module comprises a combiner disposed in the frame, each of the light sources is capable of providing a sub light beam, the sub light beams are combined by the combiner into the light beam, and the cooling airflow is capable of cooling the combiner.

4. The projection apparatus according to claim 3, wherein the frame comprise a plurality of first receiving spaces and a second receiving space, the second receiving space has a top portion, a bottom portion opposite to the top portion, and a plurality of side portions connecting between the top portion and the bottom portion, the first receiving spaces are located at the side portions, the light sources are correspondingly received in the first receiving spaces, light outgoing sides of the light sources face the second receiving space, the combiner is received in the second receiving space, and the first fan and the wind guiding device are disposed at the top portion.

5. The projection apparatus according to claim 4, wherein the frame further comprises a first opening located at the bottom portion of the second receiving space, and the cooling sub-airflows are exited out of the casing via the first opening and the air outlet.

6. The projection apparatus according to claim 4, wherein each of the first receiving spaces comprises two second openings located at two opposite sides of a light source respectively, the projection apparatus comprises at least a second fan adjacent to one of the two second openings and being between the air outlet and the air inlet, and the second fan is capable of providing another cooling airflow to flow into the casing via the air inlet, pass the light sources, and finally exit out of the casing via the air outlet.

7. The projection apparatus according to claim 6, wherein each of the light sources comprises:
    a lamp reflector, received in the first receiving space, wherein the cooling airflow provided by the second fan passes over an external surface of the lamp reflector; and
    a burner, disposed in the lamp reflector, wherein the cooling sub-airflow flows toward the burner.

8. The projection apparatus according to claim 3, wherein the lamp module comprises two light sources respectively disposed at two opposite side portions of the frame, each light source is capable of providing a sub light beam, and the sub light beams are parallel to each other.

9. The projection apparatus according to claim 3, wherein the lamp module comprises two light sources respectively disposed at two adjacent side portions of the frame, each light source is capable of providing a sub light beam, and the sub light beams are perpendicular to each other.

10. The projection apparatus according to claim 3, wherein the lamp module comprises three light sources respectively disposed at three adjacent side portions of the frame, each light source is capable of providing a sub light beam, and one of the sub light beams is perpendicular to the others.

11. The projection apparatus according to claim 1, further comprising a light shelter disposed between the lamp module and the air outlet of the casing.

12. The projection apparatus according to claim 1, further comprising a baffle disposed between the lamp module and the air outlet of the casing for guiding the cooling sub-airflows to flow via two opposite sides of the baffle to the air outlet.

13. A lamp module comprising:
a frame;
a first fan, disposed on the frame, for providing a cooling airflow;
a plurality of light sources, for providing a light beam; and
a wind guiding device, disposed between the first fan and the frame, and comprising a baffle disposed on a flow path of the cooling airflow for dividing the cooling airflow into a plurality of cooling sub-airflows for cooling the light sources respectively, wherein the wind guiding device comprises a carrying surface connecting the first fan and a connecting surface connecting the frame, the carrying surface is not parallel to the connecting surface, and an axis of the first fan defines an angle with a light axis of at least one of the light sources.

14. The lamp module according to claim 13, wherein the lamp module further comprises a combiner disposed in the frame, each of the light sources is capable of providing a sub light beam, the sub light beams are combined by the combiner into the light beam, and the cooling airflow is capable of cooling the combiner.

15. The lamp module according to claim 14, wherein the frame comprise a plurality of first receiving spaces and a second receiving space, the second receiving space has a top portion, a bottom portion opposite to the top portion, and a plurality of side portions connecting between the top portion and the bottom portion, the first receiving spaces are located at the side portions, the light sources are correspondingly received in the first receiving spaces, light outgoing sides of the light sources face the second receiving space, the combiner is received in the second receiving space, and the first fan and the wind guiding device are disposed at, the top portion.

16. The lamp module according to claim 15, wherein the frame further comprises a first opening located at the bottom portion of the second receiving space, and the cooling sub-airflows are exited out of the frame via the first opening.

17. The lamp module according to claim 15, wherein each of the first receiving spaces comprises two second openings located at two opposite sides of a light source respectively, the lamp module comprises at least a second fan adjacent to one of the two second openings and being between the air outlet and the air inlet, and the second fan is capable of providing another cooling airflow to pass the light sources and then exit out of the frame.

18. The lamp module according to claim 17, further comprising a light shelter disposed adjacent to another second opening of the first receiving space.

19. The lamp module according to claim 17, further comprising a baffle disposed adjacent to another second opening of the first receiving space for guiding the cooling sub-airflows to flow via two opposite sides of the baffle.

20. The lamp module according to claim 15, wherein each of the light sources comprises:
a lamp reflector, received in the first receiving space, wherein the cooling airflow provided by the second fan passes over an external surface of the lamp reflector; and
a burner, disposed in the lamp reflector, wherein the cooling sub-airflow flows toward the burner.

21. The lamp module according to claim 15, wherein the lamp module comprises two light sources respectively disposed at two opposite side portions of the frame, each light source is capable of providing a sub light beam, and the sub light beams are parallel to each other.

22. The lamp module according to claim 15, wherein the lamp module comprises two light sources respectively disposed at two adjacent side portions of the frame, each light source is capable of providing a sub light beam, and the sub light beams are perpendicular to each other.

23. The lamp module according to claim 15, wherein the lamp module comprises three light sources respectively disposed at three adjacent side portions of the frame, each light source is capable of providing a sub light beam, and one of the sub light beams is perpendicular to the others.

* * * * *